United States Patent
Argo et al.

(10) Patent No.: US 7,304,443 B2
(45) Date of Patent: Dec. 4, 2007

(54) REMOTE ACTIVATION OF AN AUTOMOTIVE WINDOW WASHING SYSTEM

(76) Inventors: Randy Argo, 358 E. Bonita Ave., San Dimas, CA (US) 91773; Michael Clifford, 142 E. 3rd St., San Dimas, CA (US) 91773

( * ) Notice: Subject to any disclaimer, the term of this patent is extended or adjusted under 35 U.S.C. 154(b) by 0 days.

(21) Appl. No.: 11/388,933

(22) Filed: Mar. 24, 2006

(65) Prior Publication Data

US 2006/0220598 A1 Oct. 5, 2006

Related U.S. Application Data

(60) Provisional application No. 60/666,962, filed on Mar. 30, 2005.

(51) Int. Cl.
*B60S 1/52* (2006.01)
*B05B 1/10* (2006.01)

(52) U.S. Cl. .................. 318/16; 239/130; 239/284.1; 15/250.05

(58) Field of Classification Search .................. 318/16, 318/443–445; 15/250.001, 250.01, 250.02, 15/250.05; 134/34, 140; 239/130, 131, 239/284.1
See application file for complete search history.

(56) References Cited

U.S. PATENT DOCUMENTS

| | | | | |
|---|---|---|---|---|
| 3,609,450 A | * | 9/1971 | Hart | 315/82 |
| 4,090,668 A | * | 5/1978 | Kochenour | 239/130 |
| 4,163,217 A | * | 7/1979 | Wesemeyer et al. | 340/825.57 |
| 4,821,363 A | * | 4/1989 | Delluc | 15/250.05 |
| 5,141,160 A | * | 8/1992 | Waters | 239/284.1 |
| 6,164,564 A | * | 12/2000 | Franco et al. | 239/284.1 |
| 6,237,861 B1 | * | 5/2001 | Northrop et al. | 239/284.1 |
| 6,615,438 B1 | * | 9/2003 | Franco et al. | 15/250.02 |
| 6,669,109 B2 | * | 12/2003 | Ivanov et al. | 239/284.1 |
| 6,857,582 B1 | | 2/2005 | Wang | |
| 6,892,417 B2 | * | 5/2005 | Franco et al. | 15/250.02 |
| 7,108,754 B2 | * | 9/2006 | Franco et al. | 134/34 |

* cited by examiner

*Primary Examiner*—Bentsu Ro
(74) *Attorney, Agent, or Firm*—Canady & Lortz LLP; Bradley K. Lortz (57) ABSTRACT

A remote auxiliary switch for activating an automotive window washer of a window without activating a window wiper for the window is disclosed. An operator may conveniently dispense washer fluid from the on board reservoir of the existing wiper system to use when cleaning the window manually. The remote auxiliary switch is operable external to a vehicle cabin and may function as a wireless remote. Optionally, a servo valve may also be operated through the auxiliary switch to selectively control delivery of the washer fluid to a specific nozzle when a plurality of nozzles are provided.

19 Claims, 8 Drawing Sheets

REMOTE ACTIVATION OF AN AUTOMOTIVE WINDOW WASHING SYSTEM

CROSS-REFERENCE TO RELATED APPLICATIONS

This application claims the benefit under 35 U.S.C. §119 (e) of the following co-pending U.S. provisional patent application, which is incorporated by reference herein:

U.S. Provisional Patent Application No. 60/666,962, filed Mar. 30, 2005, by Randy Argo, entitled "REMOTE ACTUATION OF A WINDSHIELD WASHING SYSTEM INSTALLED IN A VEHICLE WITHOUT ACTIVATING THE WINDSHIELD WIPER SYSTEM INSTALLED IN A VEHICLE".

BACKGROUND OF THE INVENTION

1. Field of the Invention

This invention relates to convenience systems and methods for automotive vehicles. Particularly, this invention relates to systems and methods for washing automotive windows.

2. Description of the Related Art

Virtually all automotive vehicles (passenger cars, trucks, buses, etc.) come with a window washing washing system as standard equipment. Such systems are designed to spray a cleaning solution (i.e. washer fluid) from a resorvoir onto a window (typically, the front windshield, but occasionally the rear window as well) while simultaneously activating a motorized wiper to scrub the window with the cleaning solution.

Figure 1:
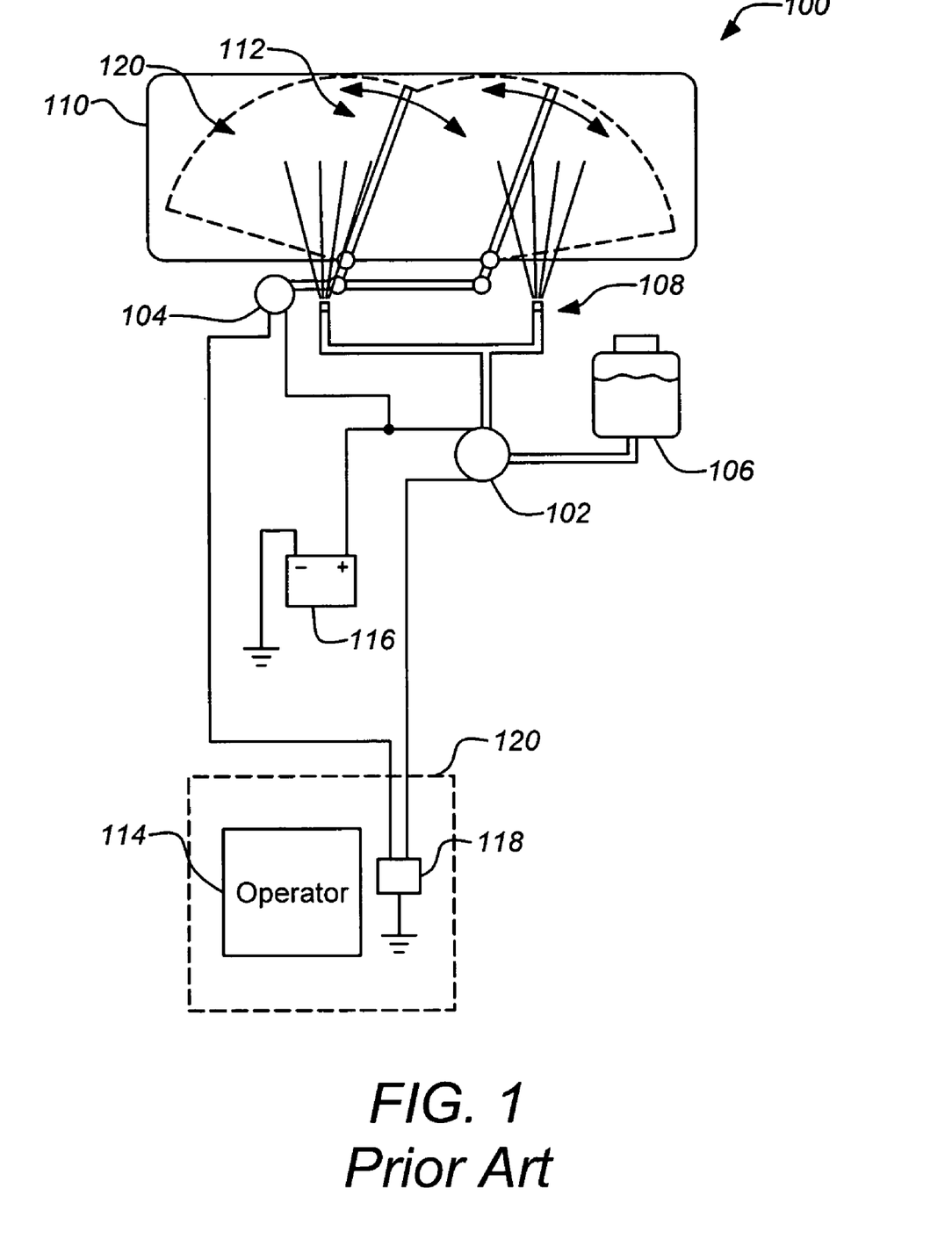
FIG. 1 illustrates a functional block diagram of a prior art washer system.

FIG. 1 illustrates a functional block diagram of a typical prior art wiper system 100. The system 100 incorporates a cleaning solution pump 102 and a wiper motor 104. When activated, the cleaning solution pump 102 draws washer fluid from a reservoir 106 and forces it through a hose having a Y-splitter to a pair of separate nozzles 108 which are positioned to spray the washer fluid onto a window 110 of the automotive vehicle, e.g. usually the front windshield, but a single wiper and nozzle system are sometimes employed for a rear window as well. At nearly same time, the wiper motor 104 drives two wiper blades 112 to scrub back and forth across the widow 110 in synchronized motion in the area of the sprayed washer fluid to remove any residue or debris from the window 110 and improve visibility for vehicle operator/driver 114.

Both the pump 102 and the wiper motor 104 are electrical, operating from the vehicle battery 116 (typically a 12 V supply) coupled to each unit. Simultaneous operations of both the pump 102 and wiper motor 104 is then controlled from a switch 118 disposed within a passenger cabin 120 of the vehicle in proximity to the operator/driver 114 (commonly on a stalk extending from the steering column of the vehicle). In a conventional wiper system, the switch 118 typically encompasses more than merely simultaneous on and off control of pump 102 and wiper motor 104. Variable control of the wiper motor speed as well as intermittant wiper control (and even a variable intermittant wiper control) may be incorporated in a typical control switch. Thus, the switch 118 may include a control circuit for advanced functions of the wiper system 100. In any case, the wiper motor is always activated (if only for a limited duration) upon activating the washer pump 102 in any conventional wiper system 100.

Despite the apparent usefulness of the conventional wiper system, there are still limitations. For example, conventional wiper systems are specifically designed to clean a an automotive window while the vehicle is in motion. While this yields a definite safety benefit, allowing a driver a ready means for maintaining reasonable visibility when driving through rain, snow, etc., the constrained wiper motion actually only cleans a small portion of the window, typically yielding two clean overlapping pie shaped patches 120 outlined by residue over the remainder of the window. This degree of window cleaning may be a tolerable expedient while driving, but it is usually not acceptable when someone desires fully cleaned windows, such as may regularly occur when stopping to refuel at a filling station.

Many filling stations may provide a squeegee and paper towels but will sometimes lack appropriate cleaning solutions if they provide any at all. Providing the proper supplies for a patron to clean his windows is not a priority and the first supply to run out will typically be the cleaning solution. Moreover, because the wipers are simultaneously activated when the washer pump is activated in a conventional system, it is not convenient to use only the fluid from on board reservoir and then clean the windows completely with a squeegee; the automatically activated wipers will immediately wipe away most of the cleaning fluid. Thus, the only option is to employ the less than complete results of the built in vehicle wiper system.

Alternately, a squeegee, paper towels and other cleaning aids can be kept in the vehicle and used when there is none available. However, because of the risk of a spill, a loose bottle of cleaning solution is usually the least desirable extra item to be stored in a vehicle. Thus, despite the fact that a wiper system is equipped on almost every vehicle, situations still arise where an operator is inconvenienced in his objective to fully clean a vehicle window.

In view of the foregoing, there is a need in the art for systems and methods that allow a convenient dispensing of washer fluid onto an automotive window. There is further a need in the art for systems and methods to facilitate ready use of washer fluid from the on board reservoir of a vehicle by a user engaged in cleaning the windows manually. Particularly, there is a need in the art for such systems and method to function without engaging the wipers motor. As detailed hereafter, these and other needs are met by the present invention.

SUMMARY OF THE INVENTION

A remote auxiliary switch for activating an automotive window washer of a window without activating a window wiper for the window is disclosed. An operator may conveniently dispense washer fluid from the on board reservoir of the existing wiper system to use when cleaning the window manually. The remote auxiliary switch is operable external to a vehicle cabin and may function as a wireless remote. Optionally, a servo valve may also be operated through the auxiliary switch to selectively control delivery of the washer fluid to a specific nozzle when a plurality of nozzles is provided.

A typical embodiment of the invention comprises a remote auxiliary switch for activating an automotive window washer for dispensing washer fluid onto a window of an automotive vehicle without activating a window wiper for the window. The remote auxiliary switch is operable external to a cabin of the automotive vehicle. The remote auxiliary switch may comprise a wired switch disposed external to the vehicle cabin or a wireless remote. The wireless remote may comprise a multifunction wireless remote for controlling a plurality of automotive convenience features.

In any case, the remote auxiliary switch may function as a momentary switch for activating the automotive window washer only while the momentary switch is held in an on position. The remote auxiliary switch may also comprise a timer switch for activating the automotive window washer for a limited time after activation. In further embodiments, a cutoff circuit may be coupled to the remote auxiliary switch and for disengaging the window wiper in response to activation of the automotive window washer with the remote auxiliary switch.

In one exemplary embodiment, a servo valve device may be used for selectively activating one of a plurality of nozzles of the automotive window washer. In this case, the remote auxiliary switch comprises a plurality of switches for selectively activating each of the plurality of nozzles of the automotive window washer. The servo valve device may utilize a normally open valve having a plurality of outlets selectively closed by activating one or more servos. Further, the one or more servos may include a bidirectional servo for selectively closing one of two outlets. When implemented along with a wireless remote, the wireless remote may have a plurality of switches for selectively activating each of the plurality of nozzles of the automotive window washer.

Similarly, a typical method embodiment of the invention may comprise providing a remote auxiliary switch for an automotive window washer external to a cabin of an automotive vehicle, and activating the automotive window washer to dispense washer fluid onto a window of the automotive vehicle without activating a window wiper for the window by operating the auxiliary switch. The method embodiment of the invention may be further modified consistent with the apparatus embodiments.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, embodiments of the present invention are directed to a remote auxiliary switch for activating an automotive window washer of a window without activating a window wiper for the window for conveniently dispensing washer fluid from the on board reservoir of the existing wiper system. The remote auxiliary switch is operable external to a vehicle cabin and preferably may comprise a wireless remote which may also control one or more known automotive convenience features (e.g. trunk release, gas filler door release, alarm, door lock and door unlock, starter, power windows, etc.) in addition.

The remote auxiliary switch is distinguished from the primary switch which operates normally operates the washer system. Thus, the remote auxiliary switch is an additional switch for controlling the washer system as described herein. Also, unlike the primary switch which is fixed internal to the cabin, the remote auxiliary switch operable external to the cabin. (Note that in cases where a wireless remote is employed, the remote auxiliary switch is portable and therefore also operable from within the cabin.) As previously mentioned, operation of a conventional washer system through the primary switch typically functions both the wipers and the washers simultaneously. Some newer systems may employ a heated fluid spray to remove ice from the window. In this case, a delay between the spraying the heated fluid and activating the wipers may be incorporated in the normal operation to allow the heated fluid time to loosen the ice. However, distinct from the present invention, such a system still operates only from a primary switch. In addition, although actual wiper movement is delayed, the wiper and washer processes are still activated simultaneously.

In addition, embodiments of the invention may incorporate a servo valve operated through the auxiliary switch to selectively control delivery of the washer fluid to specific sprayers when a plurality of sprayers are provided. Typically, the servo valve may comprise a normally open solenoid valve for each sprayer. When the button of a selected sprayer is depressed, the washer fluid pump is activated (without the wiper blades) and all other valves are closed so that washer fluid is delivered only from the selected sprayer. Alternate embodiments of the invention may incorporate selective washer control operated by any control mechanism, e.g. from a remote auxiliary switch or a primary control switch.

The various embodiments of the present invention described herein may be implemented as a manufacturer installed feature or a modification to an existing wiper system in an automotive vehicle.

2. Remote Automotive Window Washer System

Figure 2A:
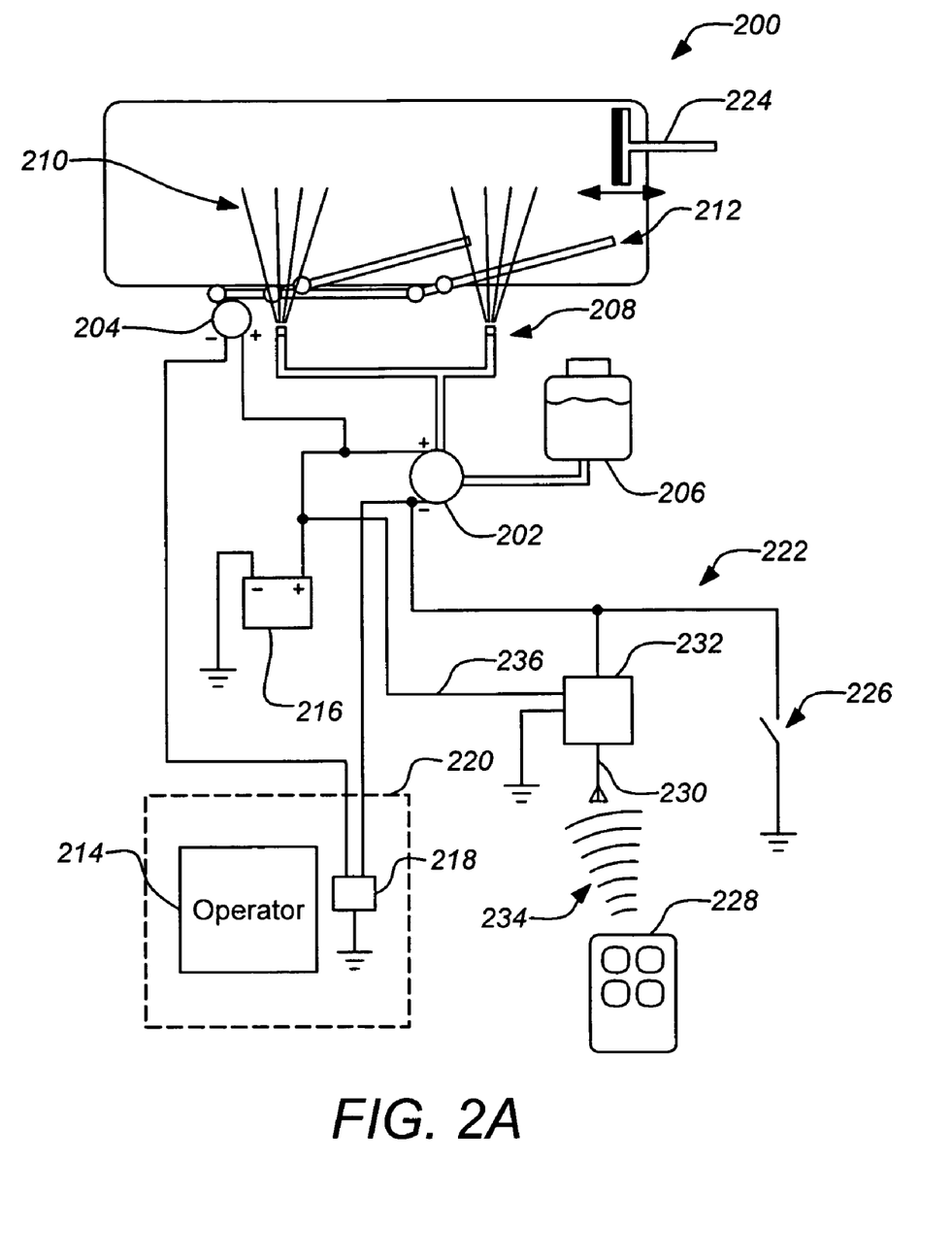
FIG. 2A illustrates a functional block diagram of an exemplary embodiment of the invention.

FIG. 2A illustrates a functional block diagram of an exemplary embodiment of the invention. The system 200 incorporates a cleaning solution pump 202 as a conventional system 100. Although the pump 202 is preferably a 12V electric fluid pump (operating off the vehicle battery 216), any known pump mechanism that can deliver an adequate fluid supply may be used. When activated, the pump 202 draws washer fluid from a reservoir 206 and forces it through a hose having a Y-splitter to a pair of separate nozzles 208 which are positioned to spray the washer fluid onto a window 210 of the automotive vehicle, e.g. the front windshield. Note that embodiments of the invention may be operated with a single nozzle without a Y-splitter as well.

A key element for the system 200 is a remote auxiliary switch 222 for operating the washer pump 202. The remote auxiliary switch 222 may be implemented in any manner that makes it operable while being external to the passenger cabin 220. In addition, the remote auxiliary switch 222 does not activate the wiper motor 204. This is distinct from the operation of the primary system switch 218 disposed within the passenger cabin 220 of the vehicle in proximity to the operator/driver 214 (as previously described with respect to the conventional system 100 of FIG. 1). It is also important that any existing wiper motor 204, which may be used to drive wiper blades 212 when the washer pump 202 is activated from the primary switch 218, is not activated when auxiliary switch 222 is activated. The wiper blades 212 remain in their stowed position at all times. Thus, the operator of the remote auxiliary switch 222 is able to completely clean then entire surface of the window 210 using the dispensed fluid (and a squeegee 224) from the reservoir 206 without it first being wiped away by the wiper blades 212 (leaving their distinctive pattern). The remote auxiliary switch 222 may be implemented in many ways.

In the simplest case, the remote auxiliary switch 222 comprises a directly wired switch 226 may be installed exterior to the cabin 220. Ideally, the switch 226 should be hidden from view, e.g. located in a fender well or under the vehicle hood. When activated, the switch 226 provides electical power to the pump 202 exclusively (without powering the wiper motor 204).

Alternately, the remote auxiliary switch 222 may comprise a wireless remote 228, e.g. a key fob remote. The wireless remote 228 may a standard device, commonly employed to operate numerous convenience features such as trunk release, gas filler door release, alarm, door lock and door unlock, starter, power windows, etc. The known standard wireless remote may use a code hopping wireless signal for security. The typical remote provides a plurality of buttons which may each control a different convenience function. Pressing a button of the remote 228 transmits a distinct signal 234 which is received by an antenna 230 of a receiver base 232. In response to the signal 234, the receiver base 232 closes the circuit applying power to the pump 202. The receiver base 232 requires its own power supply line 236 to function. The receiver base 232 and wireless remote 228 may be adapted from a factory installed wireless remote system or an aftermarket alarm system which may include optional accessory outputs ready to be applied to the novel function of the present invention. Furthermore, if the receiver base 232 has a limited current capacity or reverse switching (i.e. provides only a switched 12V supply when a switched ground is required or visa versa), a relay circuit may be employed to yield the necessary switched output. Note also that more than one type of remote auxiliary switch 222 (e.g. wired and wireless) may be impelemented simultaneously, each providing separate circuits to power the pump 202.

Although the system 200 is shown with the remote auxiliary switch 222 applying a ground to the battery-connected washer pump 202 (either through the direct switch 226 or the receiver base 232) in order to activate the pump 202, other circuits are applicable without departing from the scope of the invention as will be understood by those skilled in the art. For example, the system 200 may alternately have a circuit such that the auxiliary switch 222 (wired or wireless) applies a 12V supply to the grounded pump 202. In this case, all the switches 218, 222 of the system 200 would be wired between the positive terminal of the battery 216 and the washer pump 202 with the other terminal of the washer pump 202 grounded. The optimum circuit will depend upon the particular wiring and system of a particular vehicle. To illustrate, FIG. 2B shows an exemplary receiver base implemented with the polarity of the controlling connection to the pump 202 reversed in this manner.

Figure 2B:
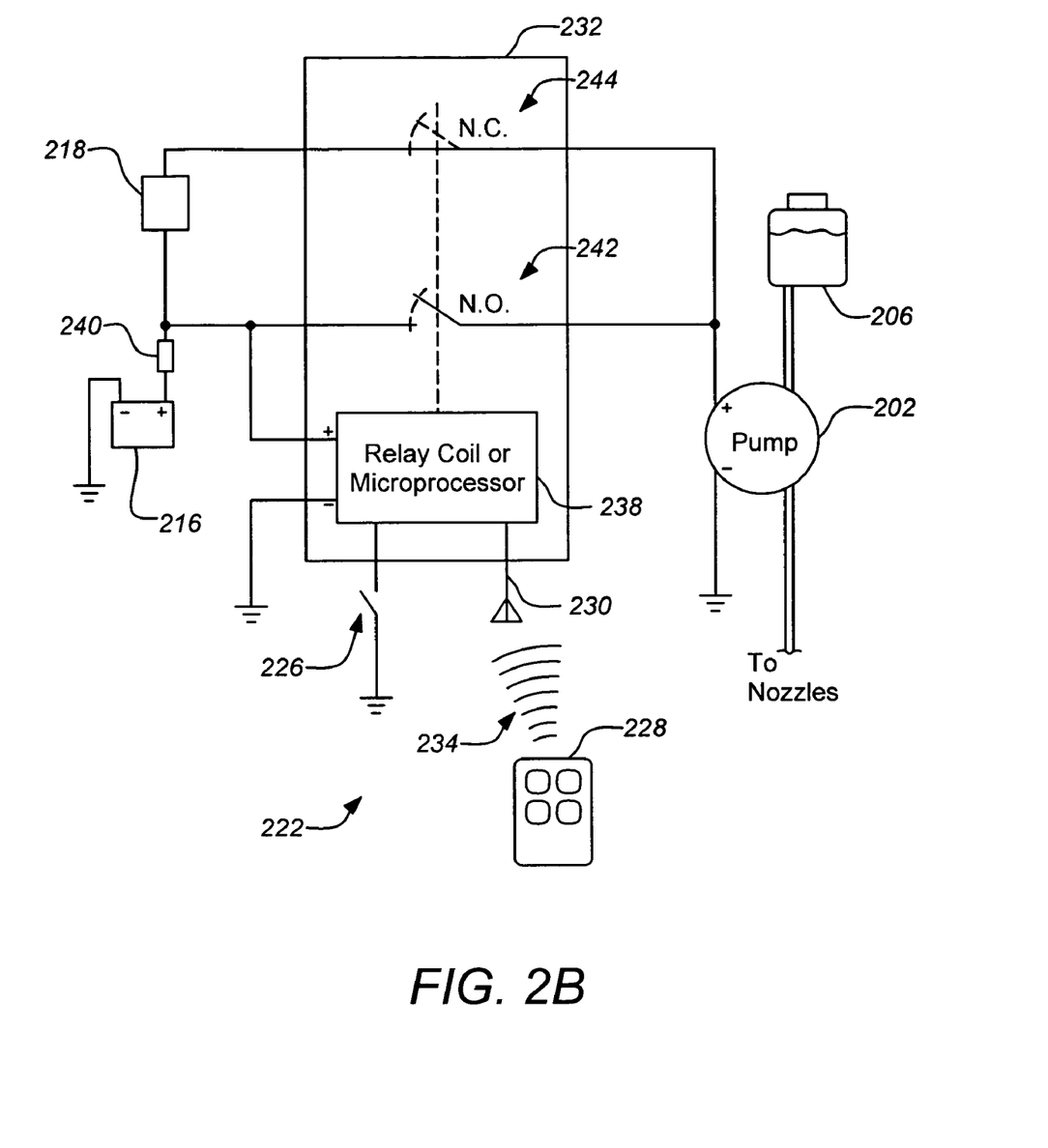
FIG. 2B shows an exemplary circuit of a washer system embodiment of the invention.

FIG. 2B shows an exemplary circuit of a washer system embodiment of the invention. In this example application, it is also necessary to install a relay coil or microprocessor 238 in order to disconnect the switch 218 that normally supplies the 12V electrical power to the pump 202 that supplies the washer fluid from the reservoir 206 to the spraying nozzles 208 and apply electrical power to the same pump 202 through a newly installed, fused 240, rated source of electrical power or a existing modified source. Disconnecting the primary switch 218 also serves to disengage the window wiper motor. The relay coil or microprocessor 238 controls two electrical switches 242, 244. The normally open switch 242 is used to activate the pump 202 from the remote auxiliary switch 222 (wired or wireless), while the normally closed switch 244 is used to cut out the power from the primary system switch 218. Note that although a single fuse 240 is shown, multiple fuses may be used for separate branches in any of the circuits described herein as necessary as is well known in the art. Also, the circuit may be a component of the receiver base 232 as shown or a separate component as desired.

It is also important to note that any existing remote activated feature on a fob remote may be reused to implement the invention. For example, a factory installed remote activated fuel access door of a vehicle provides a remotely triggered momentary 12V signal that can instead be applied to operate the pump 202 in the manner previously described (although remote operation of the fuel door will be lost). Those skilled in the art will understand that the specific circuitry and layout of components described herein may vary from vehicle to vehicle.

A variety of modes are possible in how the remote auxiliary switch 222 activates the pump 202 and the invention is not limited to any particular mode. For example, in a typical embodiment of the invention, the remote auxiliary switch 222 is set up to provide momentary electrical power to the pump that will only remain on while the switch 222 is held in the activation mode. However, alternately another embodiment of the invention may activate the pump 202 upon a first press of the switch 222 and deactivate the pump 202 upon a second press of the switch 222. Furthermore, the another embodiment of the invention may employ a timed activation where one press of the switch 222 provides activation of the pump 202 for a specified duration (e.g. 2-3 seconds). The controller base 232 may be a combination of a microprocessor, relay, contactor or any means to provide a wireless remote source to activate the invention. Operation of the switch 222 is defined as a switching function such as, but not limited to a button press on the remote auxiliary switch 222.

It should also be noted that if there is a means of or mode of operation that is necessary to other functions installed in the vehicle that does not pertain to operation of the invention but must override operation of the invention, a cutoff switch may be incorporated in the control of the invention. For example, an empty washer fluid reservoir sensor can be incorporated to trigger a cutoff and prevent operation of the pump 202 upon activation of the remote auxiliary switch 222. Further embodiments of the invention are directed to remote activation of a selected nozzle.

3. Selective Remote Activation of Nozzles in a Window Washer System

Further embodiments of the invention may incorporate selective washer control. Although the typical embodiment may employ selective operation of the washer nozzles through a remote auxiliary switch, other embodiment may incorporate selective activation of the washer nozzles by any type of control switch, including from the primary control switch. In addition, it should be noted that although the examples herein depict the invention operating with a washer system having two nozzles, typical of most conventional washer systems, the invention is applicable to washer systems having more than two nozzles as will be understood by those skilled in the art.

Figure 3A:
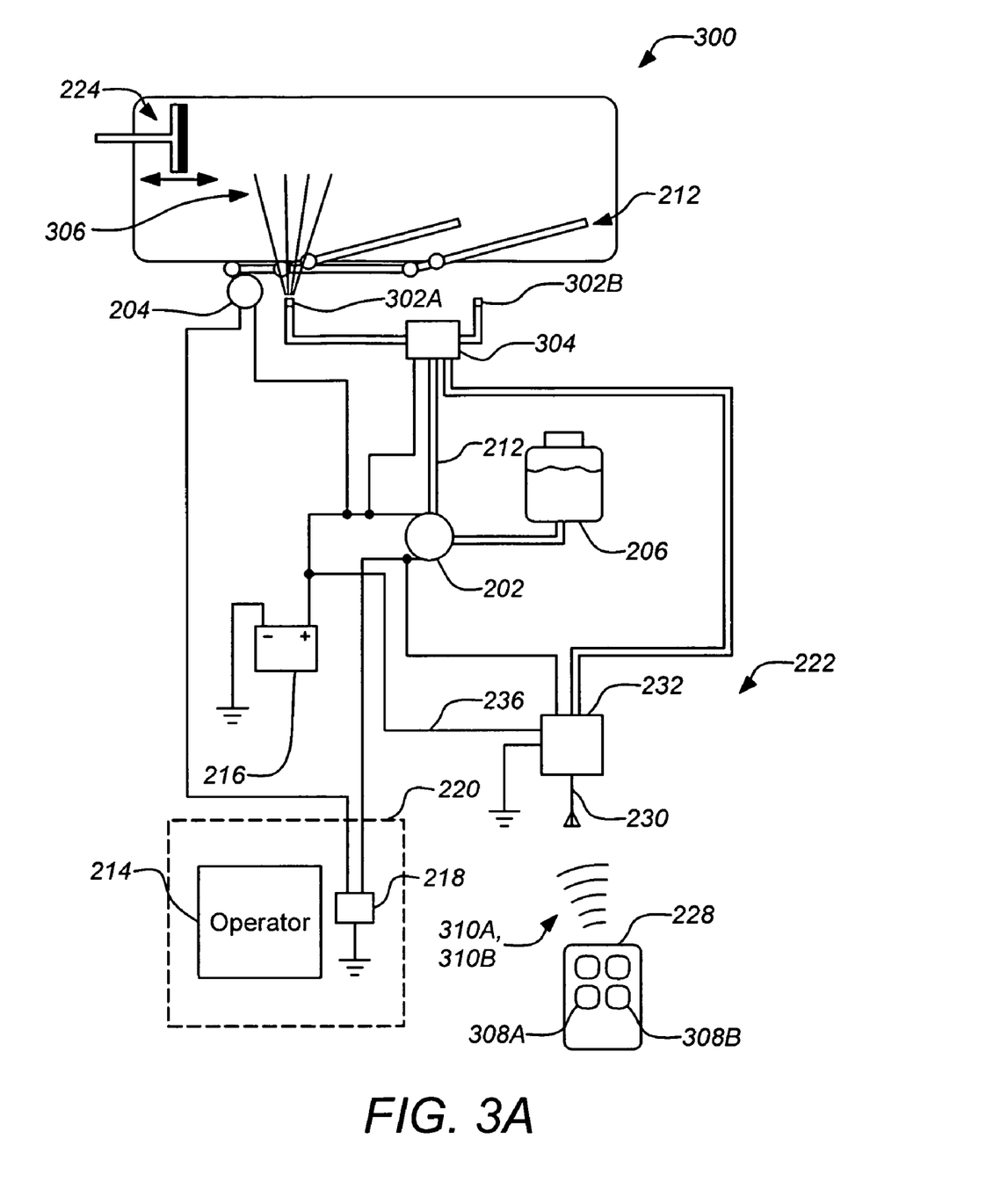
FIG. 3A illustrates a servo valve system in an exemplary embodiment of the invention.

FIG. 3A illustrates a servo valve system 300 in an exemplary embodiment of the invention. The system 300 operates essentially as system 200 respecting the use of a remote auxiliary switch 222 to activate the washer pump 202 without activating the wiper motor 204. However, this system 300 further incorporates the selective operation of a plurality of washer nozzles 302A, 302B. To do this, the remote auxiliary switch 222, employs a distinct switched signal for each nozzle 302A, 302B to be controlled. The separate signals are applied from the controller base to a servo valve device 304 (which replaces the Y-splitter) to the separate nozzles 302A, 302B. The servo valve device 304 comprises a fluid inlet from the pump 202 and a separate outlet to each nozzle 302A, 302B. The outlets may be separately closed so that fluid is only delivered as a single desired jet 306 when the fluid pump 202 is activated.

Operation of the system 300 is initiated through the remote auxiliary switch 222 (which is shown wireless, but may also comprise a direct wired form). The wireless remote 228 includes two buttons 308A, 308B (one for each separately controlled nozzle 302A, 302B). Pressing each button 308A, 308B transmits distinct signals 310A, 310B which are received by antenna 230 of the receiver base 232. In response to the signal 310A corresponding to button 308A (identified to nozzle 302A), the receiver base 232 closes both a circuit applying power to the pump 202 as well as a circuit applying power to the servo valve device 304 which closes a valve to the other nozzle 302B. Consequently fluid from the reservoir 206 is delivered by the pump 202 to be sprayed only out of nozzle 302A. In a similar manner, in response to the signal 310B (distinct from the first signal 310A) corresponding to button 308B (identified to nozzle 302B), the receiver base 232 closes both a circuit applying power to the pump 202 as well as a circuit applying power to the servo valve device 304 which closes a valve to the other nozzle 302A. In this case, fluid from the reservoir 206 is delivered by the pump 202 to be sprayed only out of nozzle 302B (not shown). The principle illustrated is that transmission of a distinct signal corresponding to a particular nozzle results in the servo valve device 304 closing all the valves to the remaining nozzle and activating the pump 202. The specific design of the servo valve device 304 and control circuit may be accomplished in any number of ways as will be understood by those skilled in the art.

Figure 3B:
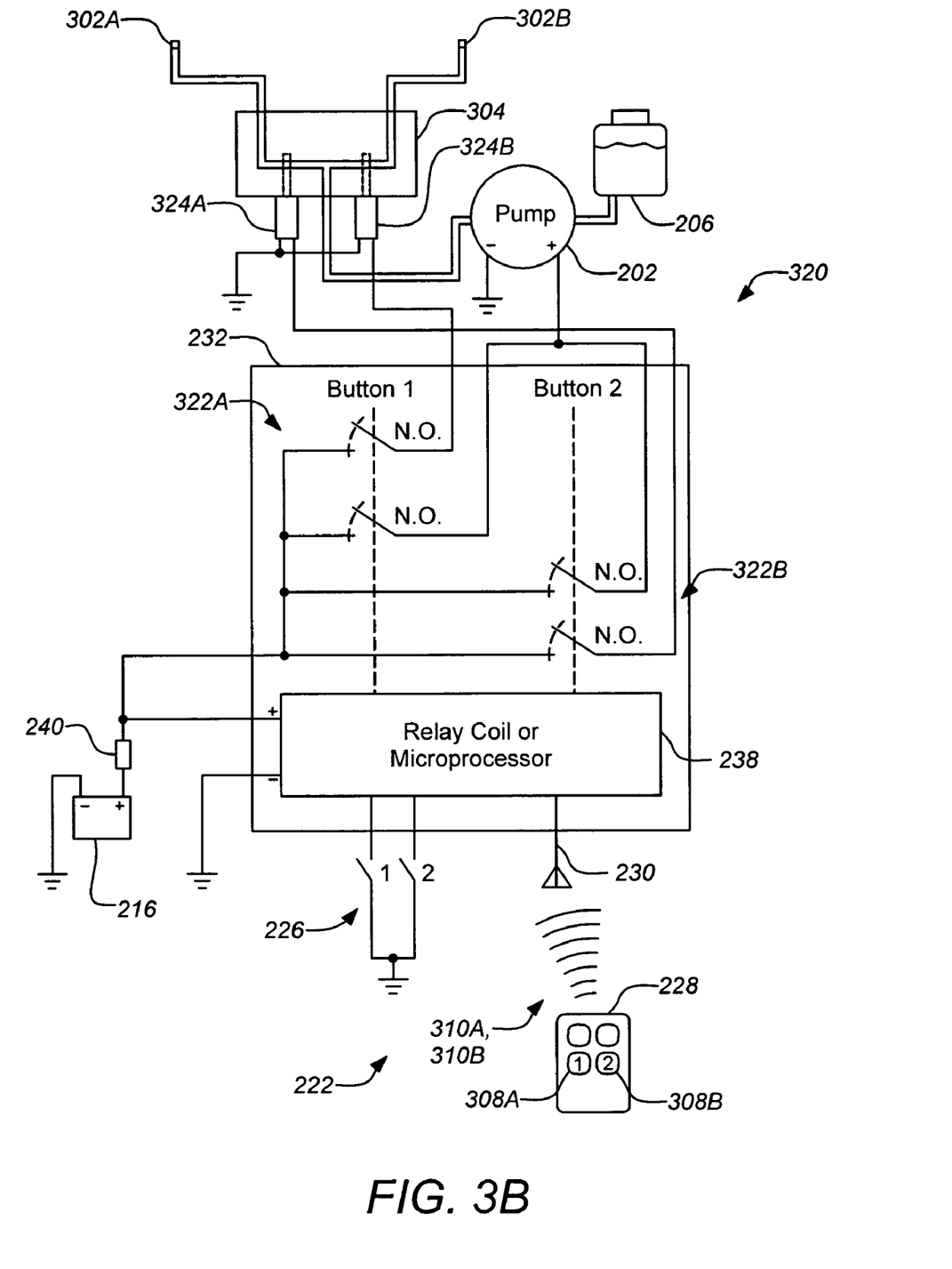
FIG. 3B illustrates an exemplary control circuit for a servo valve of a washer system embodiment of the invention.

FIG. 3B illustrates an exemplary control circuit 320 for a servo valve device 304 of a washer system embodiment of the invention. The circuit 320 may be a component of the receiver base 232 as shown or a separate component as desired. The relay coil or microprocessor 238 controls operation by upon receiving one of two distinct signals 310A, 310B from the remote 228 corresponding to the two buttons 308A, 308B. Alternately, the microprocessor 238 may receive control input from two direct wired switches 226 as shown. In either case, the alternate inputs are converted to two alternate results. Button 1 308A directs the microprocessor 238 to close two normally open switches 322A to apply battery power (fused 240) to both the fluid pump 202 and a solenoid valve 324B of the servo valve device 304. As previously described, this results in fluid being pumped from the reservoir 206 into the servo valve device 304. The closed solenoid valve 324B prevents flow to nozzle 302B, but allows flow out of nozzle 302A. Alternately, button 2 308B directs the microprocessor 238 to close two normally open switches 322B to apply battery power (fused 240) to both the fluid pump 202 and a solenoid valve 324A of the servo valve device 304. In this case, the closed solonoid valve 324A prevents flow to nozzle 302A, but allows flow out of nozzle 302B. Note that although a single fuse 240 is shown, multiple fuses may be used for separate branches in any of the circuits described herein as necessary as is well known in the art. Disconnecting the primary switch 218 as shown in FIG. 2B may also be easily incorporated into the present circuit 320 if necessary. The servo valve device 304 may be constructed using any type of actuated controllable valve, such as solenoid valves or any other acceptable type known that may operate with washer fluid.

Figure 3C:
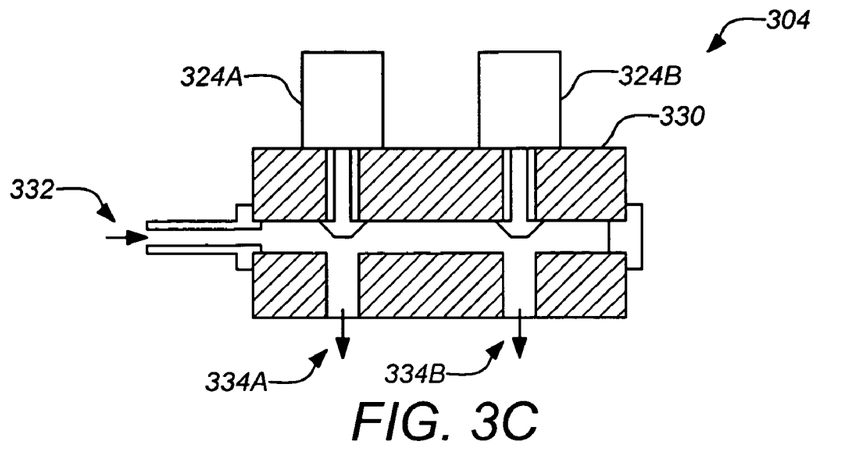
FIGS. 3C-3E illustrates an exemplary servo valve device comprising solenoid valves for a washer system embodiment of the invention.
Figure 3D:
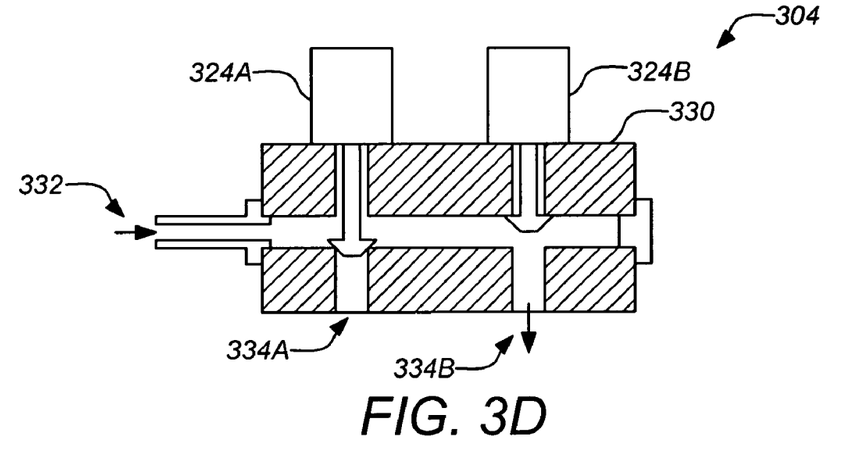
Figure 3E:
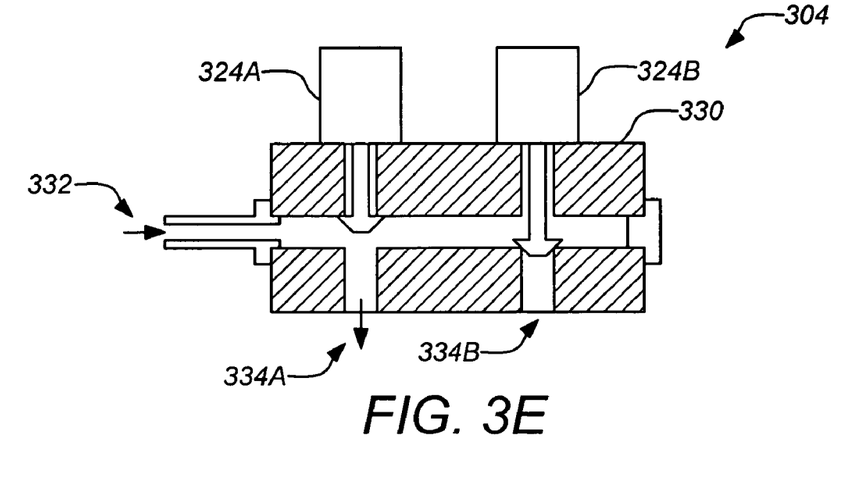

FIGS. 3C-3E illustrates an exemplary servo valve device 304 comprising solenoid valves 324A, 324B for a washer system embodiment of the invention. This servo valve device 304 employs a single valve block 330 with multiple ports machined into it. An inlet port 322 receives fluid from the pump 202. FIG. 3C shows the device 304 in the normally open unpowered state where any fluid received at the inlet port 322 can pass through both outlet ports 334A, 334B. This is the state of the servo valve device 304 when the washers (and wipers) are engaged in normal operation from the primary switch 218. FIG. 3D shows the servo valve device 304 with the first solenoid valve 324A activated in a closed position. Fluid is only permitted to flow out of the second outlet port 334B. Similarly, FIG. 3E shows the servo valve device 304 with the second solenoid valve 324B activated in a closed position. Fluid is only permitted to flow out of the second outlet port 334A. Alternate configurations of the servo valve device 304 can employ separate valve units, although more plumbing will be required to accommodate separate inlets to each unit.

Figure 3F:
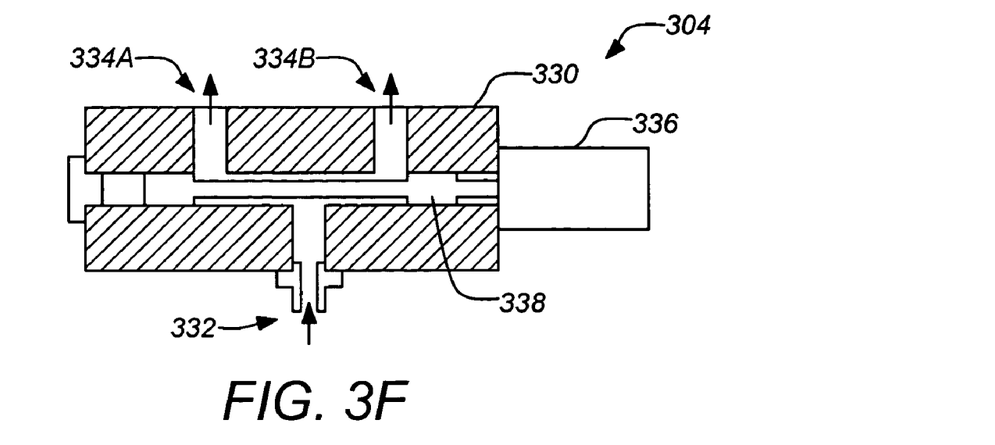
FIGS. 3F-3H illustrates an exemplary servo valve device comprising a bidirectional solenoid valve for a washer system embodiment of the invention.
Figure 3G:
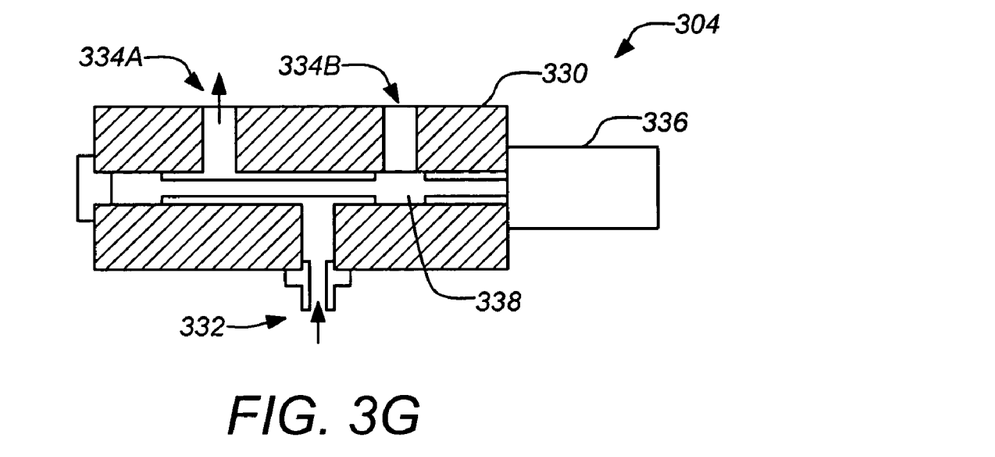
Figure 3H:
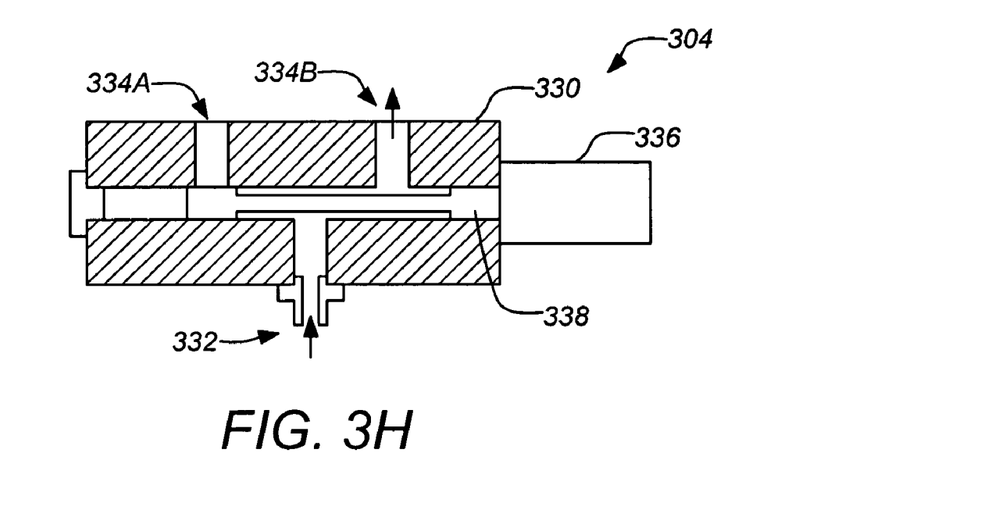

FIGS. 3F-3H illustrates an exemplary servo valve device 304 comprising a bidirectional solenoid valve for a washer system embodiment of the invention. This servo valve device 304 also employs a single valve block 330 with multiple ports machined into it. However, a single bidirectional solenoid 336 is used here instead of to separate solenoid valves. FIG. 3F shows the device 304 in the normally open unpowered state where any fluid received at the inlet port 322 can pass through both outlet ports 334A, 334B. Power applied to the solenoid 336 with polarity in one direction causes the solenoid 336 to drive the valve stem 338 in one direction. Due to the shape of the valve stem 338, this closes the outlet port 334B, but leaves outlet port 334A open as shown in FIG. 3G. When power is applied to the solenoid 336 with polarity in a reverse direction the solenoid 336 draws the valve stem 338 in the opposite direction as shown in FIG. 3H. Here, the shape of the valve stem 338 closes the outlet port 334A but leaves open the outlet port 334B. Any of the previously described control circuits may be easily modified to perform the polarity change to operate the bidirectional solenoid 336 as will be understood by those skilled in the art.

Those skilled in the art will recognize many modifications may be made to the system hardware without departing from the scope of the present invention. For example, those skilled in the art will recognize that other combinations of the above components, or any number of different components and other devices, may be used with the present invention meeting the functional requirements to support and implement various embodiments of the invention described herein, particularly as may be necessary when applied to a specific existing automotive wiper system.

4. Method of Remotely Washing Automotive Windows

Figure 4:
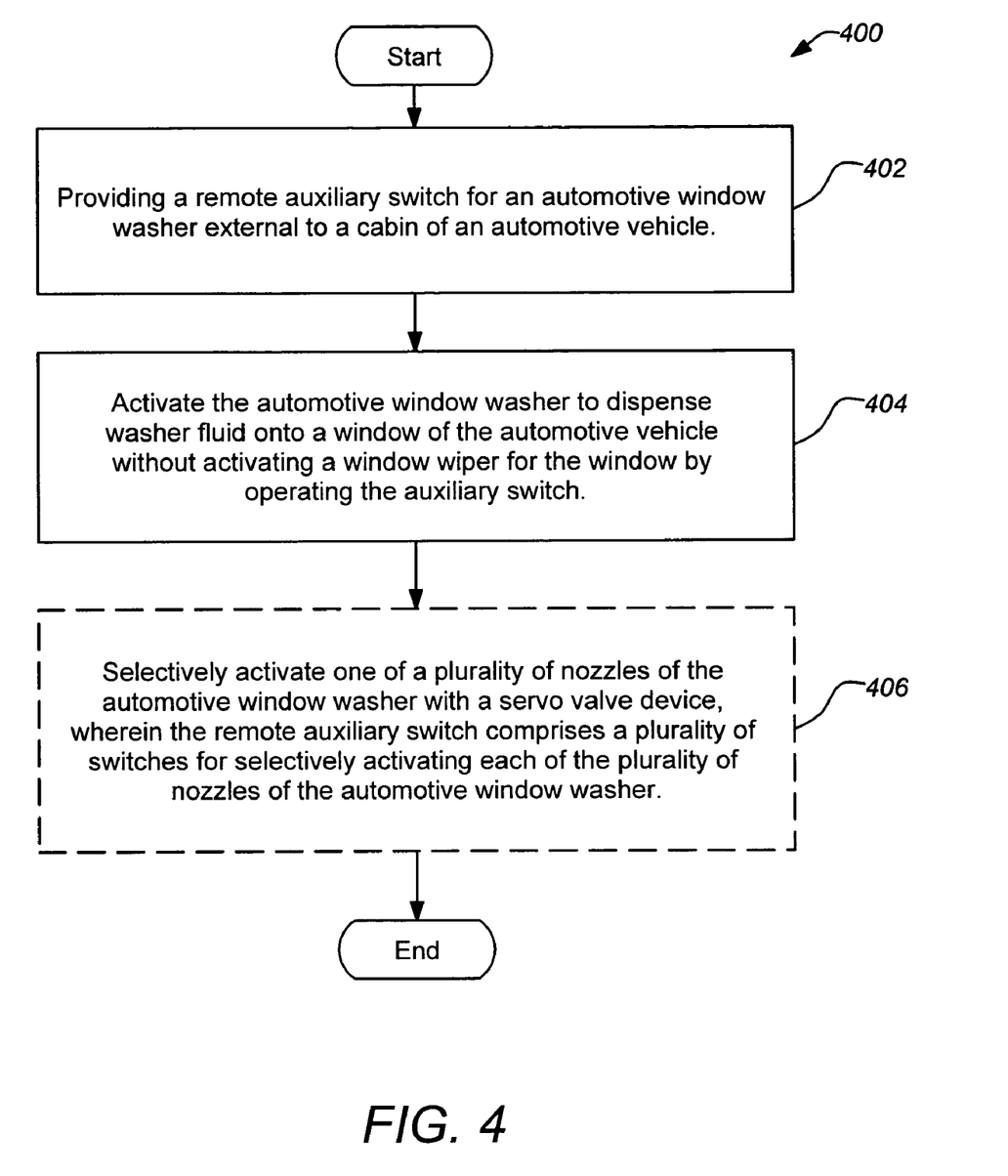
FIG. 4 is a flowchart of an exemplary method of the invention.

FIG. 4 is a flowchart of an exemplary method 400 of the invention. The method 400 begins in operation 402 by providing a remote auxiliary switch for an automotive window washer external to a cabin of an automotive vehicle. Next, in operation 404, the automotive window washer is activated to dispense washer fluid onto a window of the automotive vehicle without activating a window wiper for the window by operating the auxiliary switch. Optionally, in operation 406 one of a plurality of nozzles of the automotive window washer may be selectively activated with a servo valve device. The remote auxiliary switch comprises a plurality of switches for selectively activating each of the plurality of nozzles of the automotive window washer.

The method embodiment of the invention may be further modified consistent with the apparatus embodiments. For example, the method 400 may employ a wireless remote and/or a plurality of normally open servo valve devices. In other embodiments, only operation 404 (operated from any type of switch) and optional operation 406 may be employed.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus, comprising:
   a remote auxiliary switch for activating an automotive window washer for dispensing washer fluid onto a window of an automotive vehicle without activating a window wiper for the window using a cutoff circuit coupled to the remote auxiliary switch for disengaging the window wiper in response to activation of the automotive window washer with the remote auxiliary switch such that the window wiper remains in a stowed position at all times while the remote auxiliary switch is activated;
   wherein the remote auxiliary switch is operable external to a cabin of the automotive vehicle.

2. The apparatus of claim 1, wherein the remote auxiliary switch comprises a wired switch disposed external to the vehicle cabin.

3. The apparatus of claim 1, wherein the remote auxiliary switch comprises a momentary switch for activating the automotive window washer only while the momentary switch is held in an on position.

4. The apparatus of claim 1, wherein the remote auxiliary switch comprises a timer switch for activating the automotive window washer for a limited time after activation.

5. The apparatus of claim 1, wherein the remote auxiliary switch comprises a wireless remote.

6. The apparatus of claim 5, wherein the wireless remote comprises a multifunction wireless remote for controlling a plurality of automotive convenience features.

7. The apparatus of claim 1, further comprising a servo valve device for selectively activating one of a plurality of nozzles of the automotive window washer;
   wherein the remote auxiliary switch comprises a plurality of switches for selectively activating each of the plurality of nozzles of the automotive window washer.

8. The apparatus of claim 7, wherein the servo valve device comprises a normally open valve having a plurality of outlets selectively closed by activating one or more actuators.

9. The apparatus of claim 1, further comprising a servo valve device for selectively activating one of a plurality of nozzles of the automotive window washer;
   wherein the remote auxiliary switch comprises a wireless remote having a plurality of switches for selectively activating each of the plurality of nozzles of the automotive window washer.

10. A method, comprising:
    providing a remote auxiliary switch for an automotive window washer external to a cabin of an automotive vehicle;
    activating the automotive window washer to dispense washer fluid onto a window of the automotive vehicle without activating a window wiper for the window by operating the auxiliary switch to use a cutoff circuit coupled to the remote auxiliary switch for disengaging the window wiper in response to activation of the automotive window washer with the remote auxiliary switch such that the window wiper remains in a stowed position at all times while the remote auxiliary switch is activated.

11. The method of claim 10, wherein the remote auxiliary switch comprises a wired switch disposed external to the vehicle cabin.

12. The method of claim 10, wherein the remote auxiliary switch comprises a momentary switch for activating the automotive window washer only while the momentary switch is held in an on position.

13. The method of claim 10, wherein the remote auxiliary switch comprises a timer switch for activating the automotive window washer for a limited time after activation.

14. The method of claim 10, wherein the remote auxiliary switch comprises a wireless remote.

15. The method of claim 14, wherein the wireless remote comprises a multifunction wireless remote for controlling a plurality of automotive convenience features.

16. The method of claim 10, further comprising selectively activating one of a plurality of nozzles of the automotive window washer with a servo valve device;
    wherein the remote auxiliary switch comprises a plurality of switches for selectively activating each of the plurality of nozzles of the automotive window washer.

17. The method of claim 16, wherein the servo valve device comprises a normally open valve having a plurality of outlets selectively closed by activating one or more actuators.

18. An apparatus, comprising:
    a remote auxiliary switch means for activating an automotive window washer for dispensing washer fluid onto a window of an automotive vehicle without activating a window wiper for the window using a cutoff circuit coupled to the remote auxiliary switch for disengaging the window wiper in response to activation of the automotive window washer with the remote auxiliary switch such that the window wiper remains in a stowed position at all times while the remote auxiliary switch means is activated;
    wherein the remote auxiliary switch is operable external to a cabin of the automotive vehicle.

19. The apparatus of claim 18, further comprising a servo valve means for selectively activating one of a plurality of nozzles of the automotive window washer;
    wherein the remote auxiliary switch comprises a wireless remote having a plurality of switches for selectively activating each of the plurality of nozzles of the automotive window washer.

* * * * *